US012795565B2

(12) United States Patent
Hakola et al.

(10) Patent No.: US 12,795,565 B2
(45) Date of Patent: Nov. 10, 2026

(54) METHOD FOR MANAGING MULTIPLE TIMING ADVANCE LOOPS

(71) Applicant: Nokia Technologies Oy, Espoo (FI)

(72) Inventors: Sami-Jukka Hakola, Oulu (FI); Keeth Saliya Jayasinghe Laddu, Espoo (FI); Matha Deghel, Massy (FR); Juha Pekka Karjalainen, Oulu (FI); Timo Koskela, Oulu (FI); Mihai Enescu, Espoo (FI); Samantha Caporal Del Barrio, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 281 days.

(21) Appl. No.: 18/698,771

(22) PCT Filed: Aug. 29, 2022

(86) PCT No.: PCT/EP2022/073913
§ 371 (c)(1),
(2) Date: Apr. 4, 2024

(87) PCT Pub. No.: WO2023/061649
PCT Pub. Date: Apr. 20, 2023

(65) Prior Publication Data

US 2024/0406893 A1 Dec. 5, 2024

(30) Foreign Application Priority Data

Oct. 15, 2021 (FI) ..................................... 20216068

(51) Int. Cl.
*H04W 56/00* (2009.01)
*H04B 7/0408* (2017.01)
(Continued)

(52) U.S. Cl.
CPC ...... *H04W 56/001* (2013.01); *H04B 7/06966* (2023.05)

(58) Field of Classification Search
CPC ............. H04W 56/001; H04W 56/009; H04W 56/0045; H04B 7/06966; H04B 7/18513; H04B 7/0408; H04L 25/0224
See application file for complete search history.

(56) References Cited

U.S. PATENT DOCUMENTS

2014/0162642 A1* 6/2014 Kwon ..................... H04W 8/24 455/435.1
2014/0204919 A1* 7/2014 Chen .................... H04B 7/2681 370/336
(Continued)

FOREIGN PATENT DOCUMENTS

EP 3791529 A1 3/2021
WO 2012/119626 A1 9/2012
(Continued)

OTHER PUBLICATIONS

"5G/NR—MAC CE", ShareTechnote, Retrieved on Apr. 15, 2024, Webpage available at : https://www.sharetechnote.com/html/5G/5G_TimingAdvance.html#TAG.
(Continued)

*Primary Examiner* — Harry H Kim
(74) *Attorney, Agent, or Firm* — Carter, DeLuca & Farrell LLP

(57) ABSTRACT

There is provided an apparatus, comprising means for: transmitting (210), to a network node, an indication that a plurality of timing advance loops are supported; receiving (220), from the network node, a configuration for measuring downlink reference signals; performing (230) measurements on the downlink reference signals according to the configuration; determining (240), based on the measurement, that at least one additional timing advance loop is needed for
(Continued)

transmission of a plurality of candidate uplink beams; and transmitting (250), to the network node, an indication that at least one additional timing advance loop is needed for transmission of the plurality of candidate uplink beams.

1 Claim, 6 Drawing Sheets

(51) Int. Cl.

| | |
|---|---|
| ***H04B 7/06*** | (2006.01) |
| ***H04B 7/185*** | (2006.01) |
| ***H04L 25/02*** | (2006.01) |

(56) References Cited

U.S. PATENT DOCUMENTS

| | | | | |
|---|---|---|---|---|
| 2017/0105125 | A1* | 4/2017 | Tabet | H04W 72/0453 |
| 2019/0306775 | A1* | 10/2019 | Duan | H04L 5/0051 |
| 2019/0349983 | A1 | 11/2019 | Loehr et al. | |
| 2020/0053752 | A1* | 2/2020 | Huang | H04W 56/0005 |
| 2020/0100201 | A1* | 3/2020 | Farmanbar | H04W 56/0045 |
| 2021/0314888 | A1* | 10/2021 | Rahman | H04W 56/004 |
| 2022/0394762 | A1* | 12/2022 | Bhattad | H04W 16/14 |
| 2023/0095158 | A1* | 3/2023 | Li | H04W 56/0045<br>370/503 |
| 2024/0188055 | A1* | 6/2024 | Su | H04L 25/0204 |

FOREIGN PATENT DOCUMENTS

| | | | | |
|---|---|---|---|---|
| WO | 2014/117029 | A1 | 7/2014 | |
| WO | WO-2020188144 | A1 * | 9/2020 | H04L 5/0085 |

OTHER PUBLICATIONS

Office action received for corresponding Finnish Patent Application No. 20216068, dated May 3, 2022, 6 pages.

International Search Report and Written Opinion received for corresponding Patent Cooperation Treaty Application No. PCT/EP2022/073913, dated Nov. 28, 2022, 13 pages.

"Considerations on timing advance design in NR", 3GPP TSG RAN WG1 Meeting #91, R1-1719810, Agenda: 7.2.2.6, Huawei, Nov. 27-Dec. 1, 2017, 4 pages.

"3rd Generation Partnership Project; Technical Specification Group Radio Access Network; NR; Physical layer procedures for control (Release 18)", 3GPP TS 38.213, V18.1.0, Dec. 2023, pp. 1-298.

"3rd Generation Partnership Project; Technical Specification Group Radio Access Network; NR; Medium Access Control (MAC) protocol specification (Release 18)", 3GPP TS 38.321, V18.0.0, Dec. 2023, pp. 1-309.

"3rd Generation Partnership Project; Technical Specification Group Radio Access Network; NR; Radio Resource 7 Control (RRC) protocol specification (Release 18)", 3GPP TS 38.331, V18.0.0, Dec. 2023, pp. 1-1608.

* cited by examiner

METHOD FOR MANAGING MULTIPLE TIMING ADVANCE LOOPS

RELATED APPLICATION

This application was originally filed as PCT Application No. PCT/EP2022/073913, filed on Aug. 29, 2022, which claims priority from FI application No. 20216068, filed on Oct. 15, 2021, of which priority is claimed and is incorporated herein by reference in its entirety.

FIELD

Various example embodiments relate to a method for managing multiple timing advance loops.

BACKGROUND

In multi-TRP scenario, a user equipment is able to connect to multiple transmission reception points (TRPs). Timing advance (TA) is a special command or notification from a network to a user equipment that enables the user equipment to control and adjust its uplink transmission timing.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus, comprising means for: transmitting, to a network node, an indication that a plurality of timing advance loops are supported; receiving, from the network node, a configuration for measuring downlink reference signals; performing measurements on the downlink reference signals according to the configuration; determining, based on the measurements, that at least one additional timing advance loop is needed for transmission of a plurality of candidate uplink beams; and transmitting, to the network node, an indication that at least one additional timing advance loop is needed for transmission of the plurality of candidate uplink beams.

According to a second aspect, there is provided an apparatus, comprising means for: receiving, from a user equipment, an indication that a plurality of timing advance loops are supported by the user equipment; transmitting, to the user equipment, a configuration for measuring downlink reference signals; receiving, from the user equipment, an indication that at least one additional timing advance loop is needed for transmission of a plurality of candidate uplink beams.

According to a third aspect, there is provided a method comprising transmitting, to a network node, an indication that a plurality of timing advance loops are supported; receiving, from the network node, a configuration for measuring downlink reference signals; performing measurements on the downlink reference signals according to the configuration; determining, based on the measurements, that at least one additional timing advance loop is needed for transmission of a plurality of candidate uplink beams; and transmitting, to the network node, an indication that at least one additional timing advance loop is needed for transmission of the plurality of candidate uplink beams.

According to an embodiment, the method comprises receiving an activation of the at least one additional timing advance loop in response to transmitting the indication that at least one additional timing advance loop is needed.

According to an embodiment, the determining that at least one additional timing advance loop is needed is based on an absolute downlink reception time difference between a first downlink reference signal and a second downlink reference signal, wherein the first downlink reference signal represents a current active uplink beam, which utilizes a first timing advance loop, and wherein the second downlink reference signal is associated to one of the plurality of candidate uplink beams.

According to an embodiment, the method comprises determining that at least one additional timing advance loop is needed if the absolute downlink reception time difference is at or above a threshold.

According to an embodiment, the threshold is defined as a fraction of a cyclic prefix, a cyclic prefix, or a non-integer or integer multiple of a cyclic prefix.

According to an embodiment, the method comprises receiving a configuration of a first timing advance loop, wherein the first timing advance loop is active; and receiving a configuration of at least one additional timing advance loop, wherein the at least one additional timing advance loop is initially inactive.

According to an embodiment, the method comprises receiving a configuration of the at least one additional timing advance loop in response to transmitting the indication that at least one additional timing advance loop is needed.

According to an embodiment, the transmitting the indication that at least one additional timing advance loop is needed comprises: reporting the downlink reference signal measurements such that the downlink reference signals are grouped into two or more groups, which indicates that at least one additional timing advance loop is needed; or reporting an indication that at least one additional timing advance loop is needed per reported downlink reference signal.

According to an embodiment, wherein a first timing advance loop and the at least one additional timing advance loop are associated to a same timing advance group.

According to an embodiment, the method comprises receiving an association between the at least one additional timing advance loop and a downlink reference signal and/or an association between the at least one additional timing advance loop and a transmission coordination indication state; and applying the at least one additional timing advance loop per the downlink reference signal and/or per the transmission coordination indication state according to the received association.

According to a fourth aspect, there is provided a non-transitory computer readable medium comprising program instructions that, when executed by at least one processor, cause an apparatus to at least to perform the method according to the third aspect above and any of the embodiments thereof.

According to a fifth aspect, there is provided a computer program configured to cause an apparatus to perform the method according to the third aspect above and any of the embodiments thereof, when run on a computer.

According to a sixth aspect, there is provided a method comprising receiving, from a user equipment, an indication that a plurality of timing advance loops are supported by the user equipment; transmitting, to the user equipment, a configuration for measuring downlink reference signals; receiving, from the user equipment, an indication that at least one additional timing advance loop is needed for transmission of a plurality of candidate uplink beams.

According to an embodiment, the method comprises transmitting an activation of the at least one additional timing advance loop in response to receiving the indication that at least one additional timing advance loop is needed.

According to an embodiment, the method comprises transmitting a configuration of the at least one additional timing advance loop in response to receiving the indication that at least one additional timing advance loop is needed.

According to an embodiment, the receiving the indication that at least one additional timing advance loop is needed comprises: receiving report of the downlink reference signal measurements, wherein the downlink reference signals are grouped into two or more groups, which indicates that at least one additional timing advance loop is needed; or receiving an indication that at least one additional timing advance loop is needed per reported downlink reference signal.

According to a seventh aspect, there is provided a non-transitory computer readable medium comprising program instructions that, when executed by at least one processor, cause an apparatus to at least to perform the method according to the sixth aspect above and any of the embodiments thereof.

According to an eighth aspect, there is provided a computer program configured to cause an apparatus to perform the method according to the sixth aspect above and any of the embodiments thereof, when run on a computer.

According to a further aspect, there is provided an apparatus, comprising at least one processor; and at least one memory including computer program code, the at least one memory and the computer program code configured to, with the at least one processor, cause the apparatus to at least to perform the method according to the third aspect and any of the embodiments thereof.

According to a further aspect, there is provided an apparatus, comprising at least one processor; and at least one memory including computer program code, the at least one memory and the computer program code configured to, with the at least one processor, cause the apparatus to at least to perform the method according to the sixth aspect and any of the embodiments thereof.

DETAILED DESCRIPTION

In case a user equipment is currently having a single timing advance (TA) loop active, the UE may indicate to network whether additional TA loop is needed for a reported downlink reference signal (DL RS) if the network activates another uplink transmission beam corresponding to the reported DL RS. There is provided a method for enhanced reporting of candidate reference signals for the uplink transmission beam determination.

Figure 1:
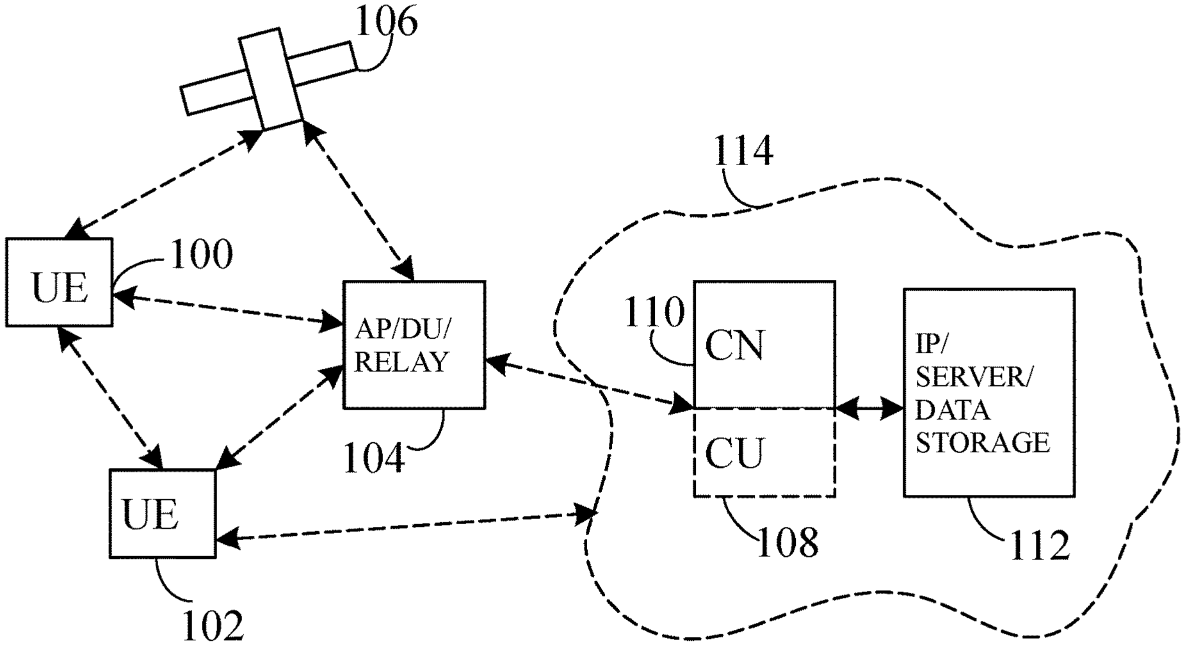
FIG. 1 shows, by way of example, a network architecture of a communication system.

FIG. 1 shows, by way of an example, a network architecture of a communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB or 5G NodeB or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

In multi-TRP scenario, UE is able to connect to multiple transmission reception points (TRPs). Beam management is applied during random access channel (RACH) procedure, when UE forms the initial connection with the network, and while the UE is in connected state. In connected state, transmitting beams and receiving beams may be refined.

Beam management defines a set of functionalities to assist UE to set its reception (Rx) and transmission (Tx) beams for downlink receptions and uplink transmissions, respectively. The functionalities can be categorized roughly according to four groups.

In beam indication, UE is assisted to set its Rx and Tx beam properly for the reception of DL and transmission of UL, respectively.

Beam acquisition, measurements and reporting refer to procedures for providing gNB knowledge about feasible DL and UL beams for the UE.

Beam recovery refers to rapid link reconfiguration against sudden blockages, i.e. fast re-alignment of gNB and UE beams.

Beam tracking and refinement refer to set of procedures to measure and align gNB and UE side beams as well as to refine gNB and UE side beams.

Regarding downlink beam management and especially for beam acquisition, measurements and reporting, different beam management procedures, referred to as P-1, P-2 and P-3, are supported within one or multiple TRPs of the serving cell.

P-1 is used to enable UE measurement on different TRP Tx beams to support selection of TRP Tx beams/UE Rx beam(s). For beamforming at TRP, it typically includes an intra/inter-TRP Tx beam sweep from a set of different beams. For beamforming at UE, it typically includes a UE Rx beam sweep from a set of different beams.

P-2 is used to enable UE measurement on different TRP Tx beams to possibly change inter/intra-TRP Tx beam(s). Measurements may be performed from a possibly smaller set of beams for beam refinement than in P-1. P-2 may be a special case of P-1.

P-3 is used to enable UE measurement on the same TRP Tx beam to change UE Rx beam in the case UE uses beamforming.

Regarding downlink beam indication a quasi-colocation (QCL) indication functionality has been defined. The UE may be configured with or the UE implicitly determines a source reference signal (RS) that UE has received and measured earlier which defines how to set Rx beam for the reception of the downlink physical signal or channel to be received. To provide UE with QCL characteristics for the target signal, that is the signal to be received, a transmission coordination indication (TCI) framework has been defined. By using the TCI framework the UE may be configured TCI state(s) to provide UE with source RS(s) for determining QCL characteristics. Each TCI state includes one or two source RSs that provide UE QCL TypeA, TypeB, TypeC and/or TypeD parameters. Different types provide the parameters as follows:

QCL-TypeA: {Doppler shift, Doppler spread, average delay, delay spread}

QCL-TypeB: {Doppler shift, Doppler spread}

QCL-TypeC: {Doppler shift, average delay}

QCL-TypeD: {Spatial Rx parameter}

In uplink, the UE is provided a parameter called spatial relation info providing a spatial source RS based on which the UE determines the uplink transmit beam. The spatial source RS can be DL RS (synchronization signal block (SSB) or channel state information reference signal (CSI-RS)) or UL RS (such as sounding reference signal (SRS)). In case of DL RS as a spatial source RS the UE sets its transmit beam to be the same or similar as was its receive beam to receive the spatial source RS. In case of UL RS as a spatial source RS the UE sets its transmit beam to be the same or similar as was its transmit beam to transmit the spatial source RS. The spatial source RS may also be the QCL-TypeD RS provided to the UE in a certain TCI state. For each physical uplink control channel (PUCCH) and SRS resource, gNB may provide explicitly spatial source or TCI state while for physical uplink shared channel (PUSCH) indirect indication may be provided.

PUSCH may be scheduled using downlink control information (DCI) format 0_0 and the spatial source is the same as with a certain PUCCH resource.

PUSCH may be scheduled using DCI format 0_1 and the spatial source is the same as indicated SRS resource(s). For example, spatial source may be one SRS resource indicated in codebook based transmission scheme, or one or multiple SRS resources indicated in non-codebook based transmission scheme.

Rel-16 introduced a default spatial relation for dedicated PUCCH/SRS (except SRS with usage='beamManagement' and SRS with usage='nonCodeBook' and configured with associated CSI-RS). If spatial relation is not configured in FR2, UE determines spatial relation as follows:

In case when control resource set(s) (CORESET) are configured on the component carrier (CC), the spatial relation is the TCI state/QCL assumption of the CORESET with the lowest index or identity (ID); or In case when any CORESETs are not configured on the CC, the spatial relation is the activated TCI state with the lowest index or ID applicable to PDSCH in the active downlink bandwidth part (DL-BWP) of the CC.

CORESET defines time and frequency resources on which physical downlink control channel (PDCCH) candidates may be transmitted to the UE.

Furthermore, Rel-16 introduced a default spatial relation for PUSCH scheduled by DCI format 0_0 where UE determines spatial relation as follows:

when there is no PUCCH resources configured on the active UL BWP CC: The default spatial relation is the TCI state/QCL assumption of the CORESET with the lowest ID. The default pathloss RS is the QCL-TypeD RS of the same TCI state/QCL assumption of the CORESET with the lowest ID when there is no PUCCH resources configured on the active UL BWP CC in FR2 and in RRC-connected mode: The default spatial relation is the TCI state/QCL assumption of the CORESET with the lowest ID. The default pathloss RS is the QCL-TypeD RS of the same TCI state/QCL assumption of the CORESET with the lowest ID.

Rel-17 is introducing a unified TCI framework meaning that TCI states so far providing QCL assumptions for the reception of DL signals and channels would be used also to provide spatial sources for the transmission of UL signals and channels. Furthermore, the unified TCI framework defines the concept of indicated TCI state. The indicated TCI state can be joint DL and UL TCI state or separate DL and separate UL TCI states. Indicated TCI state provides QCL source (DL) and spatial source (UL) for the set of downlink signals and channels and for the set of uplink signals and channels, respectively. In Rel-17 there can be one indicated joint DL and UL or one indicated DL and one indicate UL TCI state for the UE. Unified TCI framework is expected to be extended in Rel-18 so that there can be then multiple indicated DL and UL TCI states.

Timing advance (TA) is a special command or notification from a network node, e.g. gNB, to UE that enable UE to control and adjust its uplink transmission timing. This kind of UL adjustment may be applied to physical uplink shared channel (PUSCH), physical uplink control channel (PUCCH) and sounding reference signal (SRS). Network keeps measuring a time difference between PUSCH/PUCCH/SRS/RACH reception and the subframe time and may send a TA command to UE to change the PUSCH/PUCCH/SRS transmission to make it better aligned with the subframe timing at the network side. For example, if PUSCH/PUCCH/SRS arrives at the network too early, network may send a TA command to instruct the UE to transmit the signal a little bit later. As another example, if PUSCH/PUCCH/SRS arrives at the network too late, network may send a TA command to instruct the UE to transmit the signal a little bit earlier.

TA may be delivered to UE through random access response (RAR) (case 1) or medium access control (MAC) control element (CE) (case 2), for example.

In case 1, UE may figure out the TA value from two different MAC layer commands depending on situation. For the first uplink message after physical RACH (PRACH), UE may apply the TA value that it extracts from RAR (RACH Response). After the initial RACH process, UE may apply the TA value that it extracts from TA MAC CE if it received it.

Thus, UE may adjust UL transmission based on RAR during the RACH procedure.

In case 2, UE may adjust UL transmission based on the TA MAC CE, once the initial attach is complete.

For example, the TA command field may be 6 bits, which means 64 steps in total ranging from −32 to 32 $T_c$ in real timing. Since $T_c$ is 0.509 ns, the range of the physical timing is −16.3 μs to 16.3 μs with 15 kHz subcarrier spacing.

A timing advance group (TAG) comprises one or more serving cells with the same uplink TA and same downlink timing reference cell. This may mean that the TAG consists of one or more serving cells with the same uplink TA and same downlink reference timing. Each TAG comprises at least one serving cell with configured uplink, and the mapping of each serving cell to a TAG is configured by radio resource control (RRC). The TAG field in the MAC CE refers to the identifier of the TAG (tag-Id) specified in RRC message.

Both for inter-cell multi-TRP and inter-cell beam management, it becomes likely that the distance between the involved TRPs becomes larger. Then, in DL receptions, an assumption that all signals would be received within the length of a cyclic prefix (CP) becomes invalid which results in a performance loss. Similarly for the UL transmissions, performance degradation may be caused by using the same TA in uplink for transmission to all TRPs. For example, with FR2 numerology 3, that is 120 kHz subcarrier spacing, the CP duration is 0.57 μs while symbol duration is 8.33 μs. The wave travels 171 m during the CP. Depending on deployment cell sizes, it may be that the additional travelled distance results in extra path loss of only some dBs, which may be considered acceptable from the path loss perspective. However, signals received from different TRPs may still arrive with a large time difference, sometimes even larger than the CP, which is considered to degrade the performance.

Method and apparatus configured to perform the method are provided for facilitating operation with multiple timing advance processes or loops.

Figure 2:
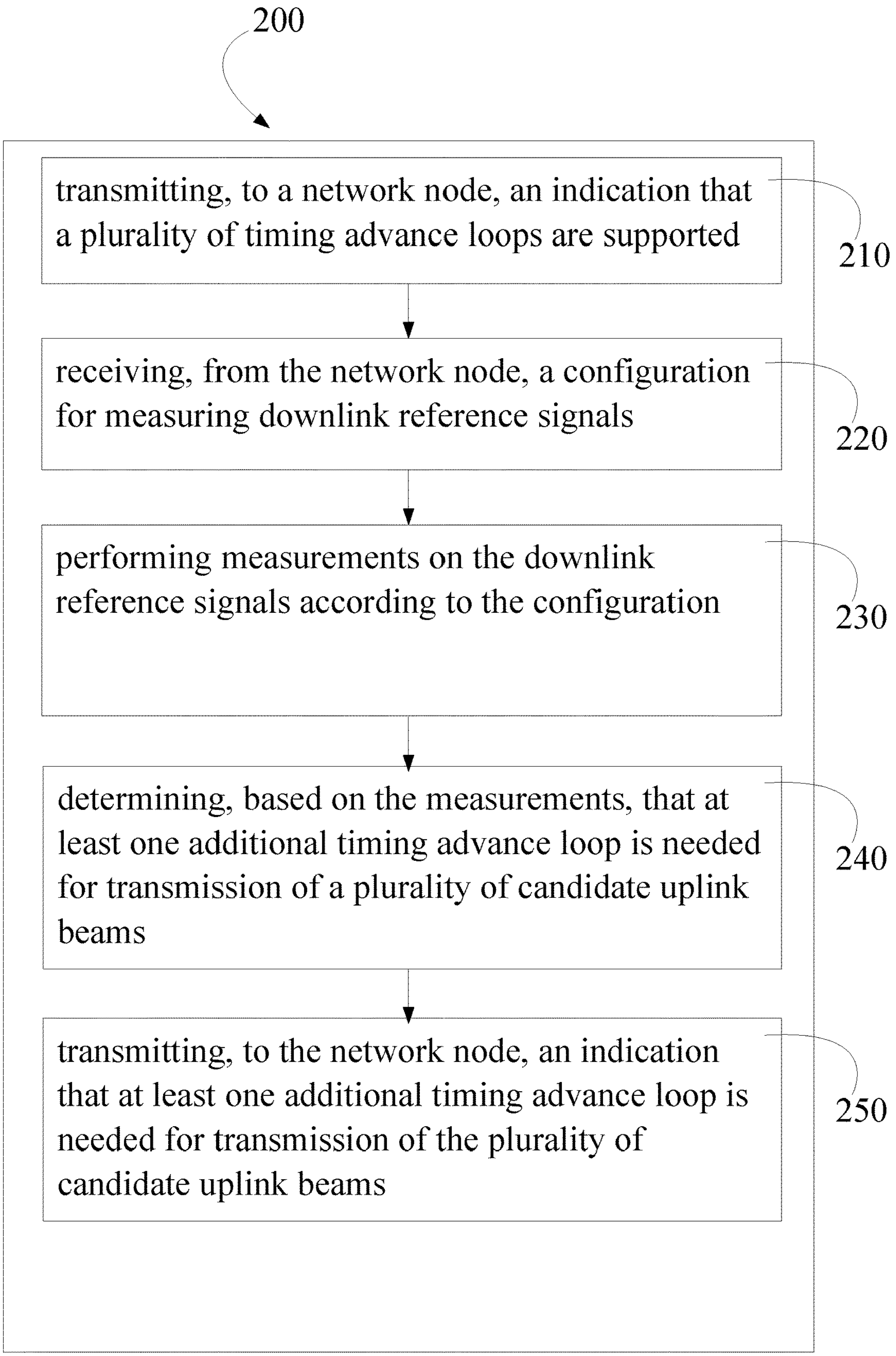
FIG. 2 shows, by way of example, a flowchart of a method.

FIG. 2 shows, by way of example, a flowchart of a method. The method may be performed by an apparatus such as a UE 100 of FIG. 1 or UE 310 of FIG. 3, e.g. a mobile phone or a smart phone, or by a control device configured to control the functioning thereof, when installed therein. The method 200 comprises transmitting 210, to a network node, an indication that a plurality of timing advance loops are supported. The method 200 comprises receiving 220, from the network node, a configuration for measuring downlink reference signals. The method 200 comprises performing 230 measurements on the downlink reference signals according to the configuration. The method 200 comprises determining 240, based on the measurements, that at least one additional timing advance loop is needed for transmission of a plurality of candidate uplink beams. The method 200 comprises transmitting 250, to the network node, an indication that at least one additional timing advance loop is needed for transmission of the plurality of candidate uplink beams.

The method as disclosed herein enables enhanced UE reporting, wherein UE reports an indication of a need for additional TA loop to the network node. The need for additional TA loop may be indicated per reported DL RS or by reporting feasible DL RSs in groups, where DL RSs in one group may be handled with the same TA loop. Thus, if more than one group is reported, or the UE reports DL RSs in more than one group, it indicates to the network that additional TA loop would be needed. The method as disclosed herein saves resources, since the additional TA loop may be dynamically activated in response to an indication of the need for the additional TA loop. The additional TA loop may also be dynamically deactivated.

The method will be described in the context of FIG. 3, which shows, by way of example, signalling between the UE 310 and a network node, e.g. gNB 390.

The UE 310 transmits 320, to a network node, e.g. gNB 390, capability information indicating whether or not the UE supports multiple simultaneous and independent TA loops within a CC or bandwidth part (BWP). The UE capability may be provided in the RRC connection setup phase. For example, the UE transmits an indication that a plurality of timing advance loops are supported. For example, UE may support two independent TA loops. As a further example, the UE may provide as capability information to the gNB information about the maximum number of supported TA loop(s) per BWP/CC including operation in the serving cell and PCI different than the serving cell. For example, UE may support more than one timing advance loop per a certain CC or a certain BWP. So, for example, one BWP may be associated with more than one timing advance loop.

The UE 310 may receive configuration of at least two TA loops comprising a first TA loop and at least one additional TA loop. A first TA loop may be in use from the RACH already, e.g. after initial access or link re-establishment or beam failure recovery. Thus, the UE 310 may receive 322, from the gNB 390, configuration of at least one additional TA loop, e.g. a second TA loop. The at least one additional TA loop may be initially inactive. As an alternative to a configuration of the second TA loop in response to UE capability indication, the gNB 390 may provide the UE 310 with configuration of the at least one additional TA loop in response to an indication from UE that at least one additional TA loop is needed, as described later.

Figure 3:
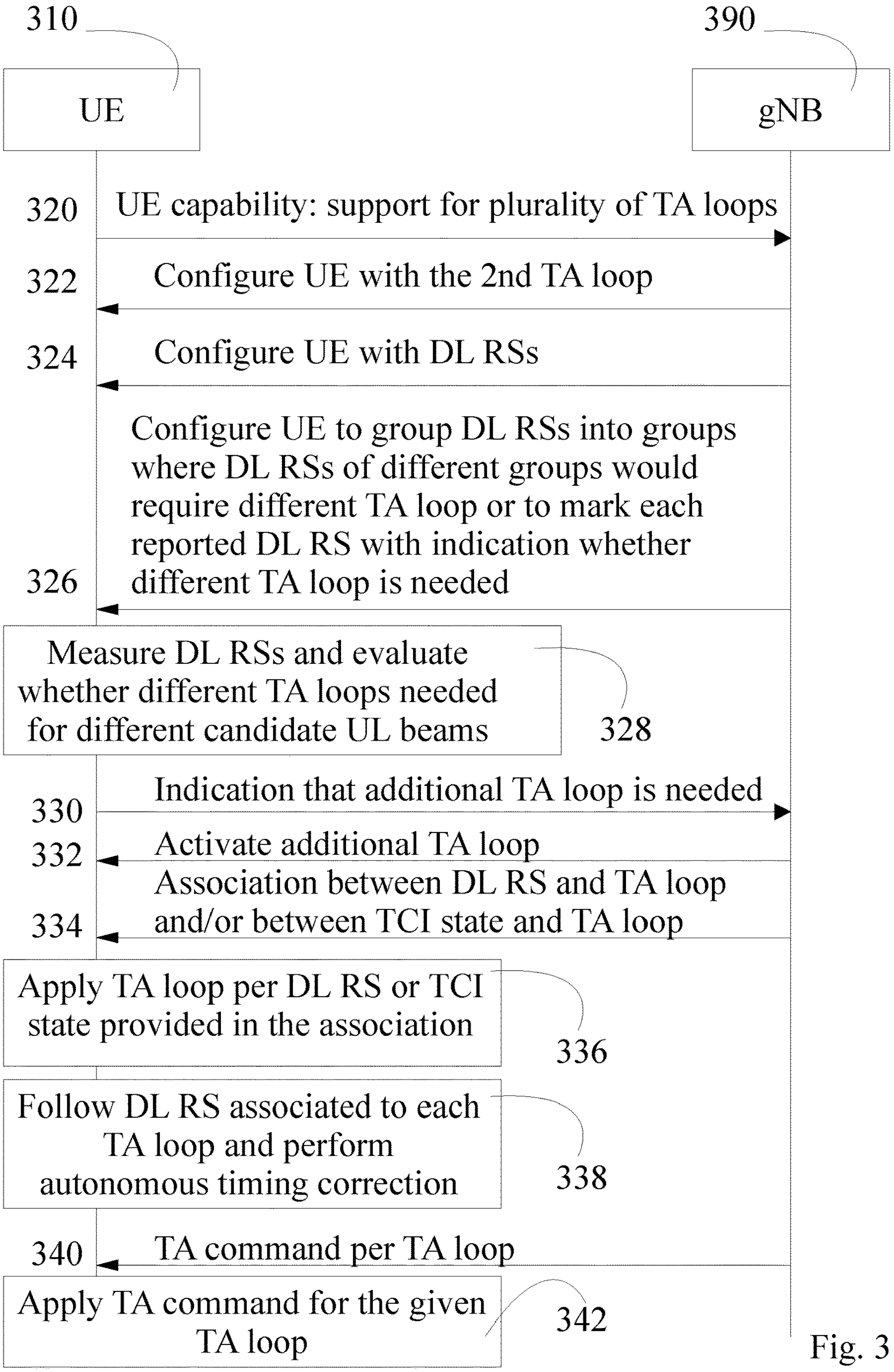
FIG. 3 shows, by way of example, signalling between a user equipment and a network node.

The UE may receive the configuration of the at least one additional TA loop together with the configuration of the first loop, via a separate configuration as shown in FIG. 3, or in response to an indication that at least one additional TA loop is needed. Since the at least one additional TA loop may be initially inactive, or configured in response to an indication of the need for at least one additional TA loop, resources are saved.

The first TA loop may be the primary TA loop. For example, the UE may have the primary TA loop in use e.g. after radio link failure, beam failure or handover, and the second TA loop may be initially inactive. The second TA loop may be dynamically activated and deactivated. For example, the second TA loop may be activated when the first TA loop is active. In some examples, this may mean that the second TA loop cannot be activated if the first TA is inactive. Thus, for example, the second TA loop may be activated only when the first TA loop is active.

The at least two TA loops may be associated to a certain timing advance group (TAG). For example, the at least two TA loops may be associated to the same TAG. For example, each TAG may have two TA loops configured. In another variant, the different TA loops may be associated to different TAGs.

The UE 310 may start initially using the first TA loop while the second TA loop is inactive.

The UE 310 receives 324 a configuration with downlink (DL) reference signals (RSs). DL RSs may be configured for measurement and reporting for DL and/or UL beam selection.

The UE 310 may receive 326 L1-RSRP reporting configuration that requests UE to group DL RSs into groups based on measured DL reception timings. That is, DL RSs of different groups would require different TA loop, and DL RSs in one group can share the same TA loop. Need for grouping may be determined based on a threshold in difference of the DL reception timings. For example, the threshold may be defined as a fraction of a cyclic prefix (CP), a CP, or a non-integer or integer multiple of a CP. Then, if the difference of the DL reception timings is at or above the threshold, DL RSs may be grouped into groups, wherein DL RSs of different groups require different TA loop.

Alternatively, UE 310 may be configured to mark reported DL RSs individually with indication whether different TA loop is needed.

In an UE implementation, the UE 310 may provide per panel measurements to the gNB 390, wherein measurement results of one panel would be within one group. Panel could be characterized also by a logical index where each logical index may have own capabilities e.g. number of SRS ports. In other words, there may be a mapping between the logical indices and certain capabilities.

The UE 310 performs 328 measurements of or on the DL RSs according to the configuration. The UE 310 evaluates, based on the measurements, whether different TA loops are needed for different candidate UL beams. The candidate UL beams are the beams represented by the DL RSs which will be reported to the network. Then, the network is able to select appropriate beams for the UE. For example, the UE 310 determines, based on the measurements, that at least one additional TA loop is needed for transmission of a plurality of candidate UL beams. Need for additional TA loop may be determined based on a threshold in difference of the DL reception timings. In other words, the determining that at least one additional timing advance loop is needed is based on an absolute downlink reception time difference between a first downlink reference signal and a second downlink reference signal, wherein the first downlink reference signal represents a current active uplink beam, which utilizes a first timing advance loop, and wherein the second downlink reference signal is associated to one of the plurality of candidate uplink beams.

For example, the threshold may be defined as a fraction of a cyclic prefix (CP), a CP, or a non-integer or integer multiple of a CP. Then, if the difference of the DL reception timings is at or above the threshold, it is determined that at least one additional TA loop is needed for transmission of a plurality of candidate UL beams.

The UE 310 transmits 330, to the gNB 390, an indication that at least one additional TA loop is needed for transmission of a plurality of candidate UL beams. The need for additional TA loop(s) may be indicated by reporting the DL RS measurements in two or more groups. When the gNB 390 receives the measurement results in two or more groups, the gNB becomes aware of the need of additional TA loop(s). The grouping of DL RS measurements may be performed by the UE based on Rx spatial filter. The filter may be a broad beam on panel level for SSB detection or across UE panels. If the UE reports e.g. two groups, it means that two TA loops would be needed and DL RSs are reported by the UE in corresponding groups.

Alternatively, indication of the need for additional TA loop(s) may be reported per DL RS, e.g. by marking each reported DL RS with an indication whether different TA loop is needed.

In case there is no activation of further UL Tx beam, and the UL Tx beam is switched to the reported DL RS, the UE 310 may transmit to the gNB 390 an indication indicating need for UL timing re-acquisition. Then, the gNB 390 may trigger RACH procedure with the UL Tx beam switch procedure. If the UL beam switching happens between beams of different groups the UL timing re-acquisition may be needed e.g. by the use of RACH procedure.

The UE may receive, in response to reporting the need for at least one additional TA loop, a configuration of the at least one additional TA loop. Alternatively, the UE may have already received that in response to informing its capability to support a plurality of TA loops. In that case, the second or additional TA loop would be initially inactive. Both ways of configuration of the at least one additional TA loop save resources compared to a situation wherein different TA loops would always be configured for a plurality of BWPs configured by the network node. If the at least one additional TA loop is configured already in response to informing the UE capability, resources are saved, since the additional TA loop would be initially inactive. If the at least one additional TA loop is configured in response to reporting the need for at least one additional TA loop, resources are saved, since no configuration of additional TA loops would be performed in vain.

The UE 310 receives 332, from the gNB 390, an activation of the at least one additional TA loop, e.g. of the second TA loop, in response to transmitting the indication that at least one additional TA loop is needed. Activation of the additional TA loop may happen at the same time the UE receives activation of the UL TCI state or joint DL/UL TCI state for the UL transmission. The activation command received from the gNB 390 may provide the TA loop index.

The UE 310 may receive 334 an association between DL RS and TA loop, and/or an association between TCI state and TA loop. The UE may receive an association between DL RS and the first TA loop, and/or an association between TCI state and the first TA loop. The UE may receive an association between DL RS and the at least one additional TA loop, and/or an association between TCI state and the at least one additional TA loop.

The UE 310 may apply 336 the TA loop per DL RS or TCI state according to association(s) provided by the gNB 390.

The UE 310 may follow 338 DL RS associated to each TA loop and perform autonomous timing correction. For example, the UE may determine the DL RS as the DL Rx timing reference for timing tracking. DL RS may be a QCL-TypeD RS of the activated or indicated UL TCI or DL/UL TCI state.

The UE may automatically update the UL Tx timing for each loop and/or receive 340 TA loop specific TA command, and apply 342 the received TA command for the given TA loop.

For example, the gNB may indicate two TA commands per serving cell or per TAG via MAC CE or RAR. The TA commands are each associated to a TA loop, where the association of a TA command to a TA loop may be determined in various ways. An association may be defined between a certain resource or resource set or associated transmission parameter(s) and a TA loop or process. The relationship may be one-to-one or many-to-one (multiple resources associated to a single timing advance loop or process). For example, the first TA command may be indicated as an absolute value and the second TA command may be indicated as a positive or negative offset (from a set of configured offset values) from the first TA command value. Alternatively, both commands may be indicated as independent absolute values.

The gNB may indicate to the UE via new or existing/reserved field (such as 1-bit field) whether or not a second TA command for the same serving cell or the same TAG ID is indicated via the same MAC CE providing the first TA command.

The gNB may indicate two TA commands per serving cell or per TAG and explicitly associate/indicate at least one command with a TA loop/process index via MAC CE or RAR. For example, at least two resource sets may be configured, each of which comprising at least one of the resources listed later below. At least one indicated TA command may be associated via MAC CE indication with a resource set index.

The indicated TCI state (be it separate or joint) may instead be replaced by at least one of: (indicated) SRS resource indicator (pointing to one or more SRS resources), (indicated) spatial relation info (e.g. for PUCCH), quasi-colocation info (such as QCL-Type-D); or even be replaced by default TCI state, or default spatial relation info. In other words, any of these terms may be used interchangeably.

Referring back to the UE 310 transmitting 320 capability information to the gNB 390, the UE may report capability information associated with Tx timing error information related to different radio frequency (RF) Tx chains, UE physical Tx antenna ports or Tx antenna panels. The Tx timing error refers to timing error between output of base-band processing and actual transmission at RF Tx chain or UE physical Tx antenna port or Tx antenna panel.

Figure 4:
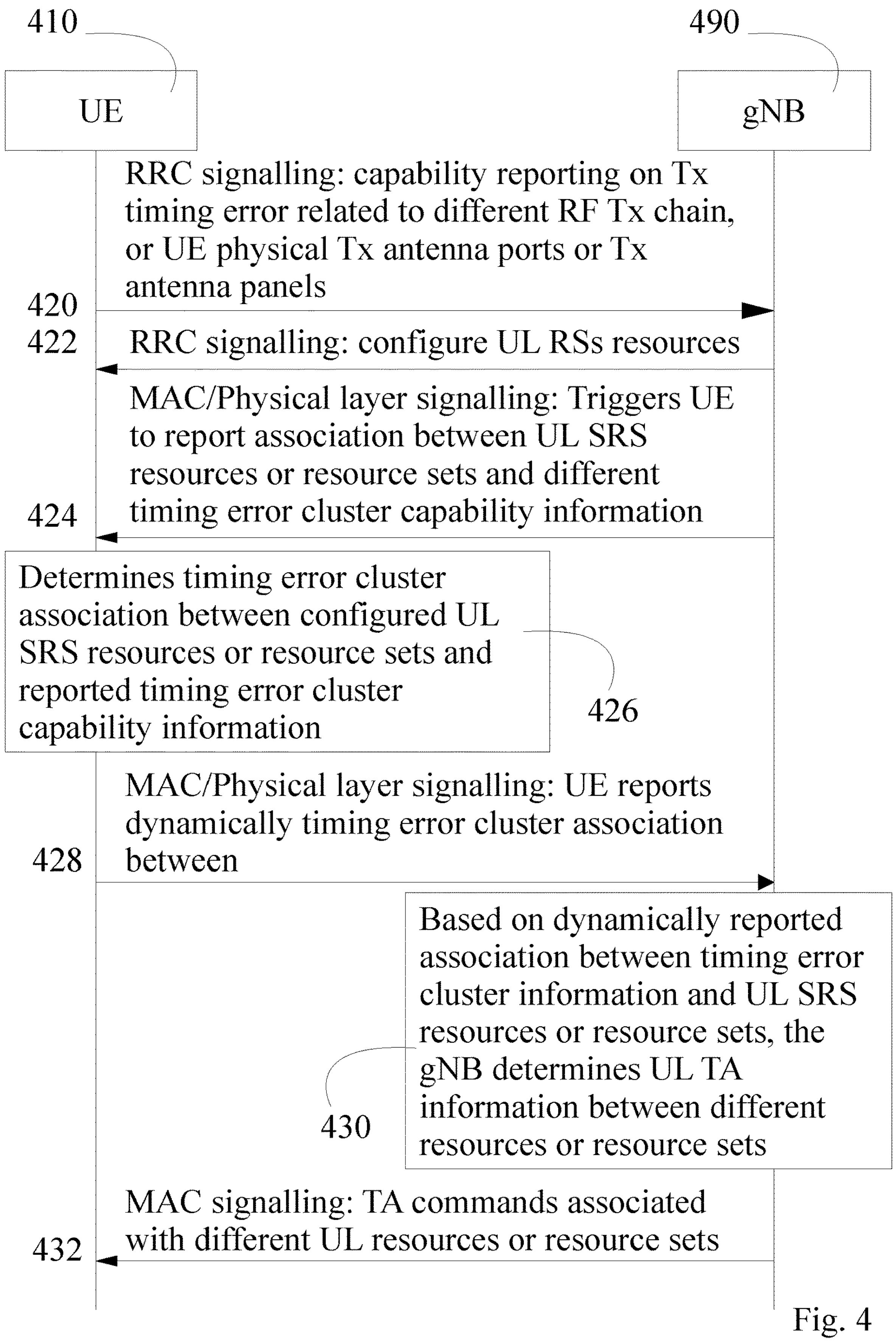
FIG. 4 shows, by way of example, signalling between a user equipment and a network node.

FIG. 4 shows, by way of example, signalling between UE 410 and a network node, e.g. gNB 490. The UE of FIG. 4 may be the same as the UE 310 of FIG. 3. The network node of FIG. 4 may be the same as the network node 390 of FIG. 3. The UE 410 may report 420 capability information, e.g. via RRC signalling. The capability information may be associated with Tx timing error information related to different RF Tx chains or UE physical Tx antenna ports or Tx antenna panels. Tx timing error refers to timing error between output of baseband processing and actual transmission at RF Tx chain or UE physical TX antenna port or TX antenna panel.

The capability report may include one or more supported Tx timing error cluster information. For example, the UE 410 may indicate via capability signaling that it supports two timing error clusters, e.g. cluster 2 and cluster 3, out of four possible timing error clusters. Different timing error clusters may be defined as:

- Cluster 0, where timing error variance Δ is defined as Δ≤X ns;
- Cluster 1, where timing error variance Δ is defined as Δ≤Y ns;
- Cluster 2, where timing error variance Δ is defined as Δ≤Z ns
- Cluster 3, where timing error variance Δ is defined as Δ≤Q ns, where the following order is assumed between different timing errors: X<Y<Z<Q.

Timing errors may also be defined relatively to one another for the different clusters.

The UE 410 may receive 422, e.g. via RRC signalling, configuration of UL RSs resources, e.g. UL SRS for beam management.

The UE 410 may receive 424, e.g. via MAC or physical layer signalling, a request to report UL Tx timing error cluster information. The UE 410 may be triggered to report, e.g. aperiodically, association between UL SRS resources or resource sets and different timing error cluster capability information.

The UE 410 may determine 426 timing error cluster association between configured UL SRS resources or resource sets and reported timing error cluster capability information.

The UE 410 may report 428 dynamically, e.g. via MAC or physical layer signalling, association between configured UL SRS resource sets or resources and reported timing error capability related to different RF Tx chains or UE physical antenna ports or Tx antenna panels. For example, UE may have been configured with two UL SRS resource sets 1 and 2 and UE has reported that it supports two UL Tx timing error clusters, e.g. cluster 2 and cluster 3. It may be assumed that N-bits are used to indicate UL Tx timing error cluster; e.g. '00'=cluster 0, '01'=cluster 1, '10'=cluster 2, '11'=cluster 3. Based on this information, the UE reports UL Tx timing error association for configured UL SRS resources, as follows: [UL SRS set #1, UL SRS set #1, '10', '11'], where '10' refers to timing error for the UL SRS resource set 1, '10' refers to timing error for the UL SRS resource set 2.

The gNB may determine 430 accurately UL TA information between different resources or resource sets based on dynamically reported association between timing error cluster information and UL SRS resources or resource sets. As a result of the reported timing error information associated with UL SRS resources, the gNB 490 may have full understanding about achievable timing error accuracy of the reported resource as well as relative timing error accuracy between different UL SRS resources. For example, the gNB may be aware of which part is coming from UL Tx implementation and which part is coming from radio channel. When having this reliability information available at the network side, the network node, e.g. gNB, is enabled to determine more accurately UL TA information to be associated with upcoming UL TA commands.

The UE 410 may receive 432, e.g. via MAC signalling, TA commands associated with different UL resources or resource sets.

Resource representing UL Tx beam may be e.g. DL RS, SRS resource or SRS resource set. The resource may be bound or associated to a TA loop or to an index of the loop. In other words, an association may be defined between a certain resource or resource set or associated transmission parameter(s) and a TA loop or process. The relationship may be one-to-one or many-to-one (multiple resources associated to a single timing advance loop or process). The resources may be at least one of or a combination of some of:

- an indicated UL TCI state or joint DL/UL TCI state; QCL-TypeD RS of the TCI state is the reference signal for timing tracking.
- a logical index representing a UE panel (i.e. UE Rx/Tx spatial filter which may be associated to a broad or a narrow UE beam), where panel is associated with reception and/or transmission configured by a network. For example, a logical index may be an abstraction of the UE panel. The UE is using the DL RS that has been associated to the logical index. The DL RS may have been provided explicitly to the UE or the DL RS may be one of the reported DL RS by the UE where the reporting has been associated to the logical index in question. In alternative approach, logical index may be associated with a cluster of antenna panels (i.e. UE defined spatial filter which may be associated to one or multiple panels) sharing the same timing error between antenna panels or associated with a cluster of UL SRS resource sets or UL SRS resources sharing the same timing error between UL SRS resource sets/UL resources.
- a PUCCH resource; In one variant, QCL-TypeD RS of the UL TCI or joint DL/UL TCI state provided for the PUCCH resource is the reference signal for timing tracking.
- a PUCCH resource group/set; In one variant, QCL-TypeD RS of the UL TCI or joint DL/UL TCI state provided for the PUCCH resource group is the reference signal for timing tracking. In another variant, QCL-TypeD RS of the UL TCI or joint DL/UL TCI state provided for the lowest PUCCH resource #id among the PUCCH resources per PUCCH resource set is the reference signal for timing tracking.
- an SRS resource set; In one variant, QCL-TypeD RS of the UL TCI or joint DL/UL TCI state provided e.g. for the first SRS resource of the set is the reference signal for timing tracking.
- a coresetPoolIndex; In one variant, QCL-TypeD RS of the DL TCI or joint DL/UL TCI state provided for the lowest CORESET #id among the CORESETs per coresetPoolIndex is the reference signal for timing tracking.
- a physical cell ID (PCI); In one variant, QCL-TypeD RS of the DL TCI or joint DL/UL TCI state provided for the lowest CORESET #id among the CORESETs per PCI is the reference signal for timing tracking.
- one or more sets, e.g. BFD-RS (beam failure detection reference signal) set(s), of DL RS (SSB/CSI-RS). The set of DL resources may be explicitly configured by network. Each set may comprise of one or more SSBs or CSI-RS. Each resource set may be associated per configured TA loop directly or indirectly e.g. associated with a CORESETpoolIndex. In case network activates TCI state for UL transmission that is associated with the DL resource. In one example, when a time alignment timer (TAT) for a respective loop expires, UE assumes not to be time aligned for UL transmission with respect to the associated resources, cell or identifier described herein. Then, UE may determine the DL resources for random access procedure to re-acquire TA for the respective loop, that is, the loop that had the time alignment timer expired.
- a pathloss reference signal that is associated to the active UL TCI state or joint DL/UL TCI state;
- a power control parameters set, which may be represented as PUCCH-PowerControlInfo, for example, including at least one of: closed-loop index, pathloss reference signal, open-loop parameters such as P0.
- one or more spatial relation info, such as PUCCH-SpatialRelationInfo.

Dynamic activation/deactivation and association/deassociation method may be applied in the TA loop/process. Dynamic L2 and/or L1 (e.g. MAC CE, RRC, and/or DCI) based signalling may be used to activate/deactivate the certain TA loop/process and provide the associated resources. In one variant, indicated UL TCI states are indexed. For example, at a time there could be indicated UL TCI state #0 and indicated UL TCI state #1. An indicated UL TCI state #0 is implicitly associated to the TA loop/process #0 and indicated UL TCI state #1 is implicitly associated to the TA loop/process #1. And every time when the indicated UL TCI state #0 is switched to another UL TCI state, also the association is switched for the TA loop in question to the new indicated UL TCI state #0. Re-association may be performed upon TCI state switch to re-assess dynamic channel/environment.

The UE may have the primary TA loop towards one PCI (the serving cell PCI) and secondary TA loop(s) towards other PCI(s), which is or are different than the serving cell PCI. Primary TA loop may follow serving cell configuration as in the existing NR system but secondary TA loop(s) may follow dynamically the UL TCI or joint DL/UL TCI state activation in the PCI different than the serving cell. In other words, the secondary TA loop is activated when the UE is activated with the UL TCI state or joint DL/UL TCI state for the PCI different than the serving cell. The secondary TA loop is active as long as the UE has active UL TX beam, represented e.g. by the UL TCI or joint DL/UL TCI state, towards the PCI different than the serving cell.

The UE may maintain a timeAlignmentTimer, TAT, (e.g. with two loops, timer TAT1 and timer TAT2) per TA loop, and the timer value may be configured per respective loop. Upon expiry of the TAT1 or TAT2 of the corresponding loop, the UE may be configured to re-acquire new TA for the loop without valid TA by initiating random access (RA) procedure, and consider for the RA resource selection the DL resources associated with the loop. For example, if TA loop1 (supervised using timer TAT1) has no valid TA, UE determines whether a downlink resources set is associated with the loop and uses the information to select resources for RA. The DL resources may be e.g. associated via the CORESETpoolindex, e.g. an index value may map to specific set of DL resources, or TA loop may be associated with specific DL resources. In some examples, the TAT for a TA loop is associated with one or more RA resources for random access procedure.

In another example, if the loops are per PCI, if the timer TAT2 expires and the expired timer is not the timer supervising the the serving cell TA (loop), UE is configured to initiate random access procedure to serving cell to obtain UL timing.

In another example, if the loops are per CORESETpoolindex, if either of the timers TAT1 and TAT2 has expired, UE is configured to initiate RA procedure to obtain new time alignment for the expired loop, based on the timer.

In another example, UE is configured with multiple TA loops, and a primary loop is configured. If the TA timer for a loop that is not at primary expires, UE is configured to be not UL time aligned for the loop and UE is not allowed to transmit uplink using the resources that are associated with the expired TA. In some examples, UE may be configured not to autonomously obtain new TA for the loop. In some examples, UE may expect NW to initiate PDCCH order to obtain new TA for the loop with expired TA. In one example, network may indicate in the PDCCH order that which of the one or more loops UE is configured to obtain TA. For example, PDCCH order may explicitly indicate the loop ID. In another example, UE may determine the indicated loop through the downlink resources indicated in the PDCCH order. In an alternative example, UE may be configured to indicate that a specific TA loop has expired e.g. via selection of RACH resources (e.g. specific RACH preambles map to specific DL resources for the specific TA loop) or via the DL resources associated with a specific loop.

Figure 5:
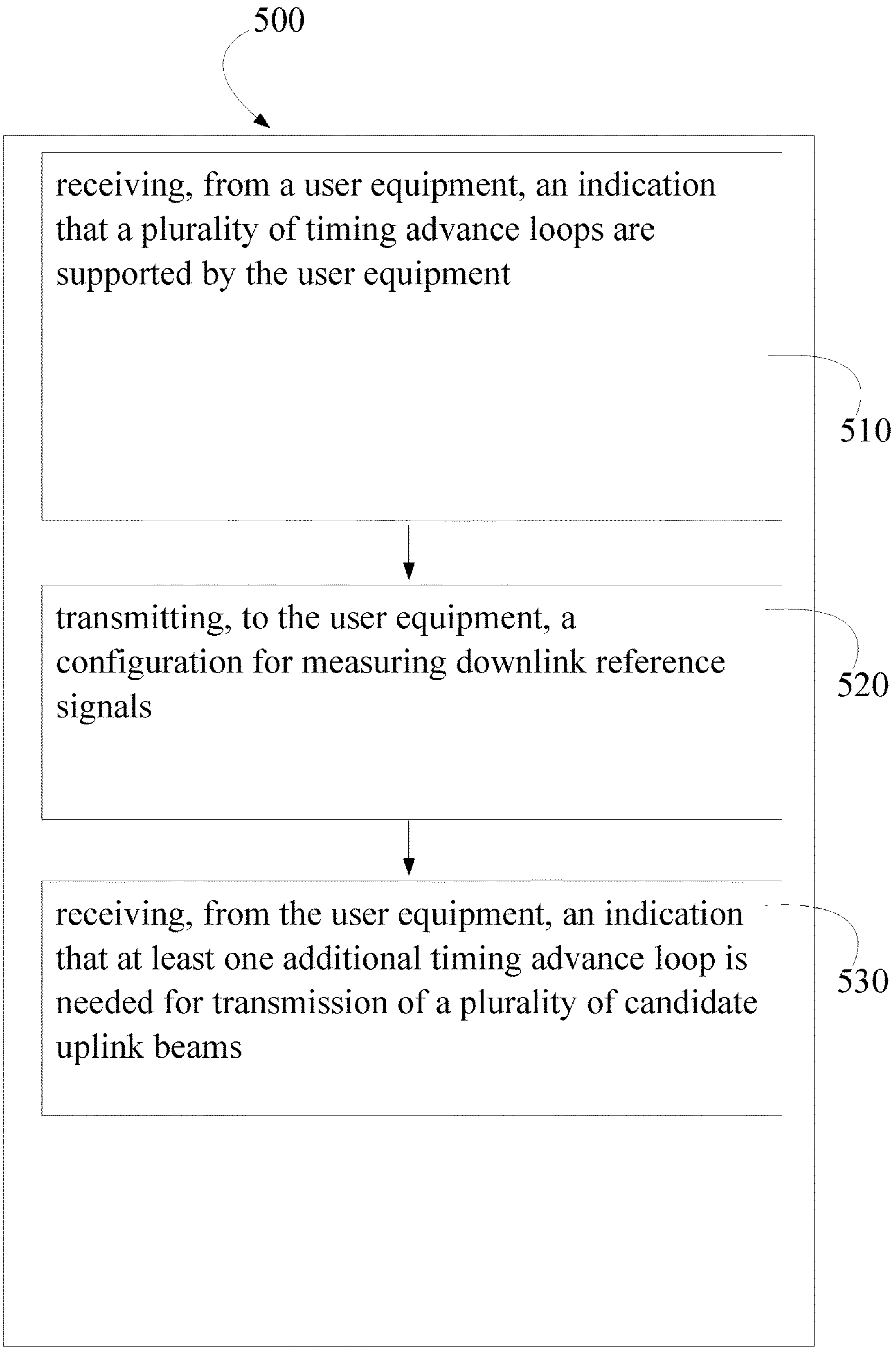
FIG. 5 shows, by way of example, a flowchart of a method.

FIG. 5 shows, by way of example, a flowchart of a method. The method may be performed by an apparatus such as a network node 390 of FIG. 3, or by a control device configured to control the functioning thereof, when installed therein. The method 500 comprises receiving 510, from a user equipment, an indication that a plurality of timing advance loops are supported by the user equipment. The method 500 comprises transmitting 520, to the user equipment, a configuration for measuring downlink reference signals. The method 500 comprises receiving 530, from the user equipment, an indication that at least one additional timing advance loop is needed for transmission of a plurality of candidate uplink beams.

Figure 6:
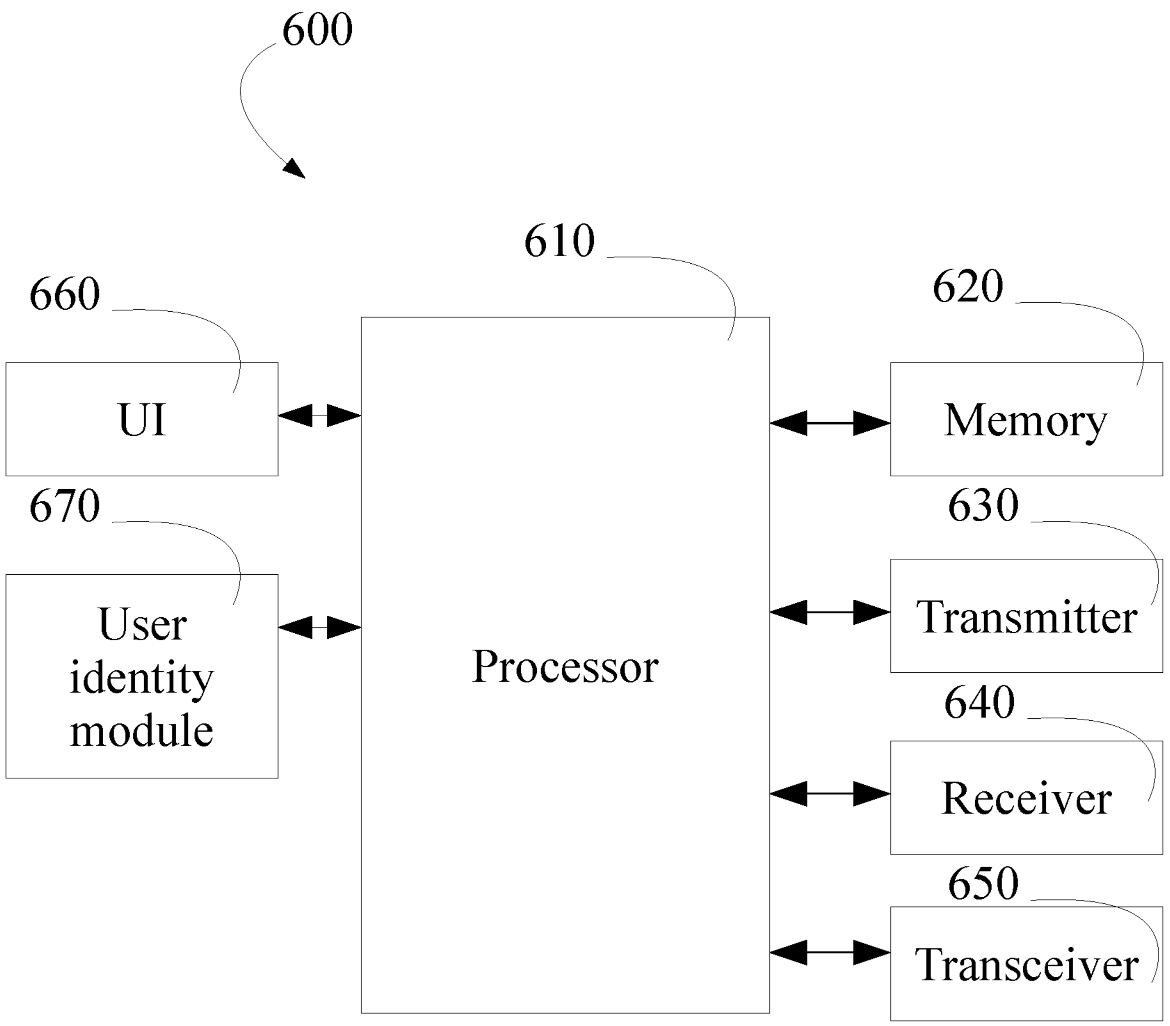
FIG. 6 shows, by way of example, a block diagram of an apparatus.

FIG. 6 shows, by way of example, a block diagram of an apparatus capable of performing the method(s) as disclosed herein. Illustrated is device 600, which may comprise, for example, a mobile communication device such as mobile 100 of FIG. 1. Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. A processing core may comprise, for example, a Cortex-A8 processing core manufactured by ARM Holdings or a Steamroller processing core designed by Advanced Micro Devices Corporation. Processor 610 may comprise at least one Qualcomm Snapdragon and/or Intel Atom processor. Processor 610 may comprise at least one application-specific integrated circuit, ASIC. Processor 610 may comprise at least one field-programmable gate array, FPGA. Processor 610 may be means for performing method steps in device 600. Processor 610 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or a network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part external to device 600 but accessible to device 600.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver. Transmitter 630 and/or receiver 640 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 600 may comprise a near-field communication, NFC, transceiver 650. NFC transceiver 650 may support at least one NFC technology, such as NFC, Bluetooth, Wibree or similar technologies.

Device 600 may comprise user interface, UI, 660. UI 660 may comprise at least one of a display, a keyboard, a touchscreen, a vibrator arranged to signal to a user by causing device 600 to vibrate, a speaker and a microphone. A user may be able to operate device 600 via UI 660, for example to accept incoming telephone calls, to originate telephone calls or video calls, to browse the Internet, to manage digital files stored in memory 620 or on a cloud accessible via transmitter 630 and receiver 640, or via NFC transceiver 650, and/or to play games.

Device 600 may comprise or be arranged to accept a user identity module 670. User identity module 670 may comprise, for example, a subscriber identity module, SIM, card installable in device 600. A user identity module 670 may comprise information identifying a subscription of a user of device 600. A user identity module 670 may comprise cryptographic information usable to verify the identity of a user of device 600 and/or to facilitate encryption of communicated information and billing of the user of device 600 for communication effected via device 600.

Processor 610 may be furnished with a transmitter arranged to output information from processor 610, via electrical leads internal to device 600, to other devices comprised in device 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to device 600, from other devices comprised in device 600. Such a receiver may comprise a serial bus receiver arranged to, for example, receive information via at least one electrical lead from receiver 640 for processing in processor 610. Alternatively to a serial bus, the receiver may comprise a parallel bus receiver.

Processor 610, memory 620, transmitter 630, receiver 640, NFC transceiver 650, UI 660 and/or user identity module 670 may be interconnected by electrical leads internal to device 600 in a multitude of different ways. For example, each of the aforementioned devices may be separately connected to a master bus internal to device 600, to allow for the devices to exchange information. However, as the skilled person will appreciate, this is only one example and depending on the embodiment various ways of interconnecting at least two of the aforementioned devices may be selected.

The invention claimed is:

1. An apparatus, comprising:

at least one processor; and at least one memory including instructions, the at least one memory and the instructions configured to, with the at least one processor, cause the apparatus at least to:

transmit, to a network node, an indication that a plurality of timing advance loops are supported;

receive, from the network node, a configuration for measuring downlink reference signals;

perform measurements on the downlink reference signals according to the configuration;

determine, based on the measurements, that at least one additional timing advance loop is needed for transmission of a plurality of candidate uplink beams, wherein the determining that at least one additional timing advance loop is needed is based on an absolute downlink reception time difference between a first downlink reference signal and a second downlink reference signal, wherein the first downlink reference signal represents a current active uplink beam, which utilizes a first timing advance loop, and wherein the second downlink reference signal is associated to one of the plurality of candidate uplink beams, and based on the absolute downlink reception time difference being at or above a threshold, wherein the threshold is defined as a fraction of a cyclic prefix, a cyclic prefix, or a non-integer or integer multiple of a cyclic prefix;

transmit, to the network node, an indication that at least one additional timing advance loop is needed for transmission of the plurality of candidate uplink beams, wherein the transmitting the indication that at least one additional timing advance loop is needed comprises:

reporting the downlink reference signal measurements such that the downlink reference signals are grouped into two or more groups, which indicates that at least one additional timing advance loop is needed; and reporting an indication that at least one additional timing advance loop is needed per reported downlink reference signal;

receive a configuration of the first timing advance loop, wherein the first timing advance loop is active;

receive a configuration of the at least one additional timing advance loop in response to transmitting the indication that at least one additional timing advance loop is needed, wherein the at least one additional timing advance loop is initially inactive;

receive an activation of the at least one additional timing advance loop in response to transmitting the indication that at least one additional timing advance loop is needed;

receive an association between the at least one additional timing advance loop and a downlink reference signal and an association between the at least one additional timing advance loop and a transmission coordination indication state;

apply the at least one additional timing advance loop per the downlink reference signal and per the transmission coordination indication state according to the received association, wherein the first timing advance loop and the at least one additional timing advance loop are associated to a same timing advance group;

receive an L1-RSRP reporting configuration that requests grouping of the downlink reference signals into groups based on measured downlink reception timings;

group the downlink reference signals into groups based on measured downlink reception timings, wherein downlink reference signals of different groups require different timing advance loops and downlink reference signals in one group share a same timing advance loop;

mark each reported downlink reference signal with an indication of whether a different timing advance loop is needed;

initially use the first timing advance loop while the at least one additional timing advance loop is inactive; and automatically update uplink transmission timing for each timing advance loop, wherein each timing advance group comprises at least one serving cell with configured uplink, and a mapping of each serving cell to a timing advance group is configured by radio resource control (RRC), wherein each transmission coordination indication state includes two source reference signals (RSs) that provide user equipment (UE) quasi-colocation (QCL) TypeA, TypeB, TypeC, and TypeD parameters, wherein transmitting the indication that the plurality of timing advance loops are supported comprises transmitting capability information indicating that the apparatus supports multiple simultaneous and independent timing advance loops within a component carrier or bandwidth part, wherein the capability information indicates a maximum number of supported timing advance loops per component carrier or bandwidth part, including operation in a serving cell and a physical cell identifier different than the serving cell, wherein the at least one additional timing advance loop is activated only when the first timing advance loop is active, wherein the activation of the at least one additional timing advance loop is received at a same time as activation of an uplink transmission coordination indication state or a joint downlink/uplink transmission coordination indication state for uplink transmission, and wherein an activation command for the at least one additional timing advance loop provides a timing advance loop index, and wherein the downlink reference signal is a QCL-TypeD reference signal of an activated or indicated uplink transmission coordination indication state or downlink/uplink transmission coordination indication state.

* * * * *